(12) United States Patent
King

(10) Patent No.: US 9,120,422 B2
(45) Date of Patent: Sep. 1, 2015

(54) MULTIPLE HEADLAMP ADJUSTER LINKAGE

(75) Inventor: Robert King, Seymour, IN (US)

(73) Assignee: Valeo North America, Inc., Seymour, IN (US)

( * ) Notice: Subject to any disclaimer, the term of this patent is extended or adjusted under 35 U.S.C. 154(b) by 269 days.

(21) Appl. No.: 13/537,239

(22) Filed: Jun. 29, 2012

(65) Prior Publication Data

US 2014/0003080 A1    Jan. 2, 2014

(51) Int. Cl.
*B60Q 1/06* (2006.01)
*B60Q 1/068* (2006.01)

(52) U.S. Cl.
CPC .......... *B60Q 1/0683* (2013.01); *B60Q 2200/32* (2013.01); *B60Q 2200/36* (2013.01)

(58) Field of Classification Search
CPC ............ B60Q 2200/36; B60Q 1/0683; B60Q 2200/32; B60Q 1/068; B60Q 1/06
USPC ......... 362/525, 523, 420, 419, 418, 475, 476, 362/507, 43, 44, 47, 46, 50, 54, 528, 431, 362/512, 513, 515, 516, 529, 543, 52, 45, 362/48, 49, 51, 53, 530, 531, 532, 273, 289, 362/421, 284, 40, 41, 42, 55, 56, 57, 58, 59, 362/60
See application file for complete search history.

(56) References Cited

U.S. PATENT DOCUMENTS

| 4,293,897 | A | | 10/1981 | Deverrewaere |
| 4,737,891 | A | * | 4/1988 | Burton ........................... 362/528 |
| 4,882,658 | A | * | 11/1989 | Allen ............................ 362/524 |
| 4,916,586 | A | * | 4/1990 | Van Duyn et al. ............ 362/524 |
| 5,260,857 | A | | 11/1993 | Lukkarinen et al. |
| 5,270,907 | A | * | 12/1993 | Lisak ............................ 362/528 |
| 5,530,629 | A | | 6/1996 | Uehara |
| 6,220,735 | B1 | * | 4/2001 | Matubara ...................... 362/523 |
| 6,540,386 | B2 | * | 4/2003 | Fujino et al. .................. 362/525 |
| 7,033,053 | B2 | * | 4/2006 | Watson et al. ................. 362/515 |
| 7,753,575 | B2 | | 7/2010 | Mochizuki et al. |
| 7,975,974 | B2 | | 7/2011 | Schaefer et al. |
| 2003/0103358 | A1 | * | 6/2003 | Tatsukawa et al. ........... 362/539 |
| 2003/0169587 | A1 | * | 9/2003 | Uchida .......................... 362/37 |
| 2008/0198617 | A1 | * | 8/2008 | Schwab et al. ................ 362/545 |
| 2008/0266890 | A1 | | 10/2008 | Mochizuki et al. |
| 2009/0116213 | A1 | * | 5/2009 | Jeon et al. ...................... 362/40 |
| 2011/0090695 | A1 | * | 4/2011 | Yanai ............................ 362/277 |

FOREIGN PATENT DOCUMENTS

| DE | 10003929 | 8/2001 |
| DE | 102009033910 | 1/2011 |

(Continued)

*Primary Examiner* — Ismael Negron
*Assistant Examiner* — James Endo
(74) *Attorney, Agent, or Firm* — Jacox, Meckstroth & Jenkins

(57) ABSTRACT

A vehicle headlamp (10) has first and second lamp components (12, 14) mounted in a housing (16) having a wall (18). The first and second components (12, 14) are simultaneously adjustable from a double pivot rocker (20), the double pivot rocker (20) being mounted to the wall (18) by a stationary pivot bearing (21). The first and second lamp components (12, 14) each have a fixed pivot bearing (22, 24) fixed to the wall (18) and a floating pivot bearing (26, 28) fixed to the double pivot rocker (20). The first and second components (12, 14) can be reflectors positioned in a vertical array.

10 Claims, 3 Drawing Sheets

(56) References Cited

FOREIGN PATENT DOCUMENTS

| | | |
|---|---|---|
| EP | 0081399 | 6/1983 |
| FR | 2410213 | 6/1979 |
| FR | 2424157 A1 * | 11/1979 |
| GB | 2041188 | 9/1980 |
| WO | 2011045358 | 4/2011 |

* cited by examiner

MULTIPLE HEADLAMP ADJUSTER LINKAGE

CROSS-REFERENCE TO RELATED APPLICATIONS

There is no cross-reference to a related application.

GOVERNMENT CONTRACT

This application is not the result of any government contract and the United States Government has no rights hereunder.

TECHNICAL FIELD

These embodiments relate to light sources and more particularly to light sources used with vehicle headlamps. Still more particularly, it relates to multiple vehicle headlamps that may be adjusted simultaneously.

BACKGROUND ART

An increasing number of automotive vehicles employ multiple light sources, for example, for forward lighting. Generally, when such multiple light sources are used, one may be used for the high beam and a second one for the low beam. Often the adjustment features for these multiple beams require individual adjustment of each beam, which often results in a misalignment of the beams or the expenditure of considerable man-power and special measurements to insure that the beams are properly focused in a desired manner. Known in the art are U.S. Pat. No. 7,975,974 (Schaefer); U.S. Pat. No. 5,530,629 (Uehara) and U.S. Pat. No. 5,260,857 (Lukkarinen).

DISCLOSURE OF EMBODIMENTS

It is, therefore, an object to obviate the above enumerated disadvantages of the prior art.

It is another object to enhance the adjustment features of multiple vehicle headlamps.

Yet another object is the improvement of the alignment of multiple vehicle headlamps.

These objects are accomplished, in one aspect, by the provision of a vehicle headlamp comprising first and second lamp components mounted in a housing having a wall. The first and second components are simultaneously adjustable from a double pivot rocker. The double pivot rocker is mounted to the wall by a stationary pivot bearing. The first and second lamp components each have a fixed pivot bearing fixed to the wall and a floating pivot bearing fixed to the double pivot rocker. Actuation of the double pivot rocker adjusts both the first and second components in exactly the same manner and degree, thus eliminating and obviating the problems enumerated above with respect to the prior art.

BEST MODE FOR CARRYING OUT THE EMBODIMENTS

For a better understanding of the present embodiments, together with other and further objects, advantages and capabilities thereof, reference is made to the following disclosure and appended claims taken in conjunction with the above-described drawings.

Figure 1:
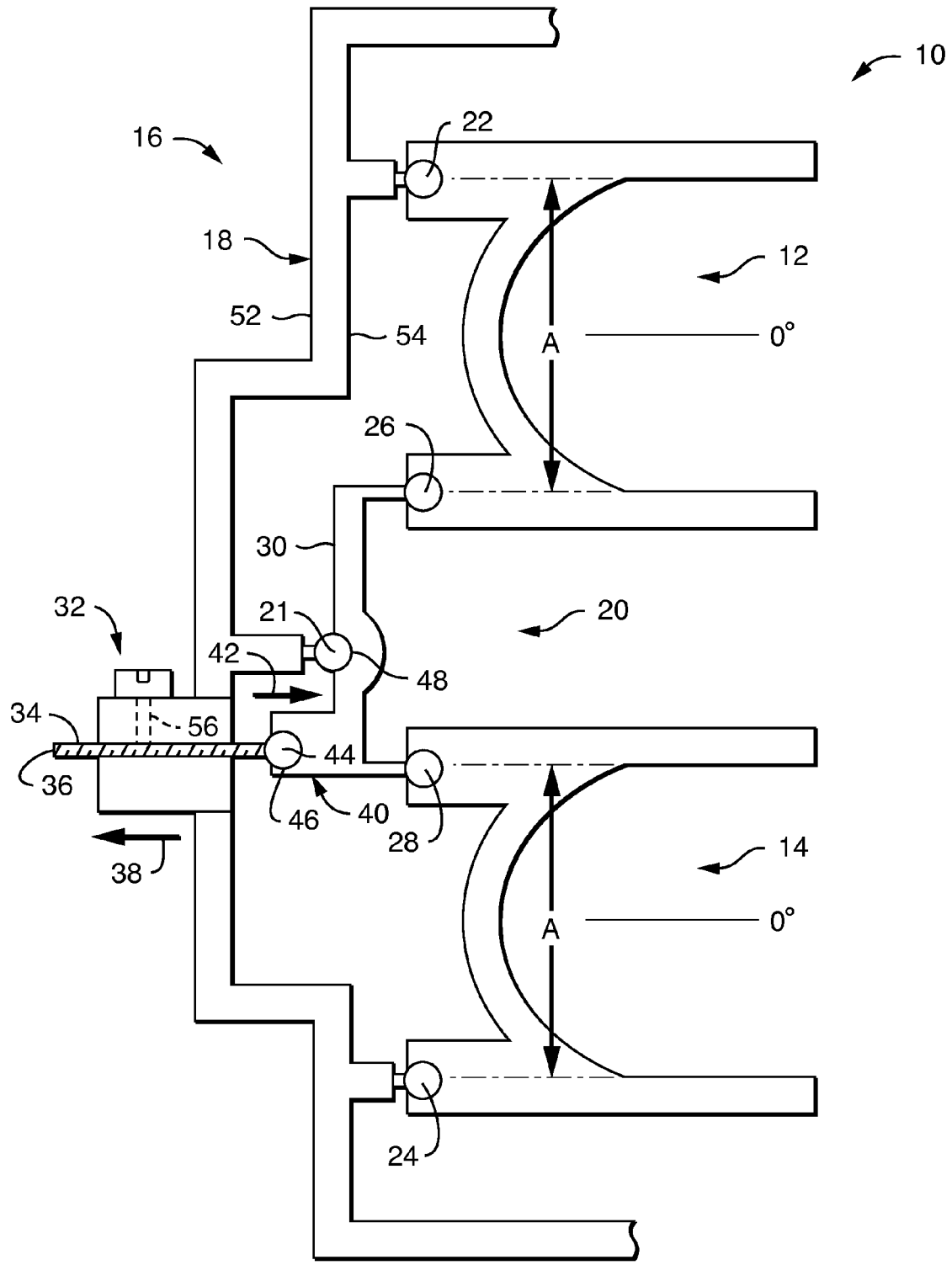
FIG. 1 is a schematic elevation view of an embodiment in a first or starting mode.
Figure 2:
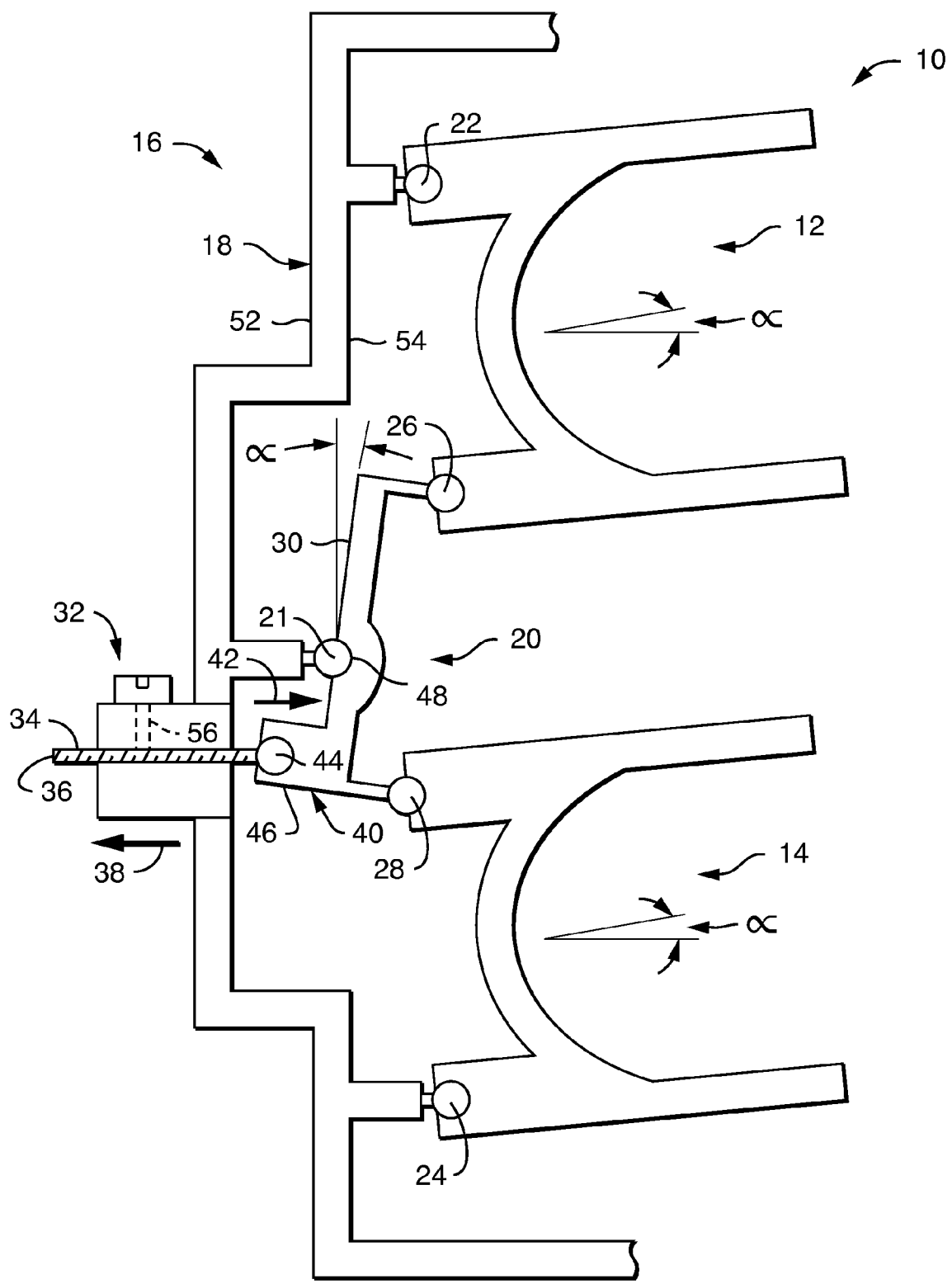
FIG. 2 is a similar schematic elevation of an embodiment in a second or adjusted mode.

Referring now to the drawings with greater particularity there is shown in FIG. 1 a vehicle headlamp 10 comprising first and second lamp components 12, 14 mounted in a housing 16 having a wall 18. The first and second components 12, 14 are simultaneously adjustable from a double pivot rocker 20. The double pivot rocker 20 is mounted to the wall 18 by a stationary pivot bearing 21. The first and second lamp components 12, 14 each have a fixed pivot bearing 22, 24 fixed to the wall 18 and a floating pivot bearing 26, 28 fixed to the double pivot rocker 20. The wall 18 has a first surface 52 and a second surface 54 to which stationary pivot bearing 21 is affixed. As illustrated in FIGS. 1 and 2 the first and second components 12, 14 are positioned in a vertical array; however, this orientation is exemplary only. In a preferred embodiment, the lamp components 12, 14 comprise reflectors.

Figure 3:
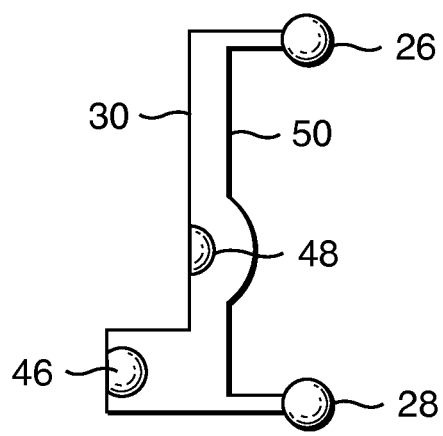
FIG. 3 is an elevation view of a double pivot rocker.

The double pivot rocker 20 (see, FIG. 3) comprises a base member 30 defining a first bearing surface 48 that is adapted to be coupled to the headlamp housing 16 for displacement relative thereto. A second bearing surface 46 is adapted to receive a headlamp adjuster 44; and third and fourth bearing surfaces 26, 28 are adapted to be coupled to the respective first and second lamp components 12, 14. The third and fourth bearing surfaces 26, 28 are on a face 50 of the base member 30 opposite the first and second bearing surfaces 48, 46.

The double pivot rocker 20 is displaced upon actuation of an adjusting mechanism 32 that comprises a threaded member 34 that has a distal end 36 projecting in a first direction 38 and a proximal end 40 projecting in an opposite direction 42. The proximal end 40 is coupled to the double pivot rocker 20. The adjusting mechanism 32 can be driven by direct application of a force to the distal end 34 or, in a preferred embodiment, can be driven via a right-angle drive train, shown schematically at 56.

As will be seen in FIGS. 1 and 2, the proximal end 40 of the threaded member 32 comprises a spherical pivot 44 that is positioned in a receptor 46 in the double pivot rocker 20 and is operative to move the double pivot rocker 20 from an initial position to an adjusted position. Displacement of the double pivot rocker 20 by an amount α ("alpha") in a first direction causes displacement of each of the lamp components 12, 14 by the same amount α in a second direction opposite the first direction.

As shown in the drawings, referring to FIG. 1, a distance A from each fixed pivot bearing 22, 24 to a location of coupling each floating pivot bearing 26, 28 to the double pivot rocker 20 is equal for the first and second lamp components 12, 14.

Thus, the mechanism supplied simultaneously adjusts multiple light sources.

While there have been shown and described what are at present considered to be the preferred embodiments, it will be apparent to those skilled in the art that various changes and modifications can be made herein without departing from the scope of the embodiments as defined by the appended claims.

For purposes of this application it is to be understood that when an element or layer is referred to as being "on," "connected to" or "coupled to" another element or layer, it can be directly on, connected to or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. The term "and/or" includes any and all combinations of one or more of the associated listed items.

Although the terms "first," "second," "third" etc. may be used to describe various elements, components, regions, layers and/or sections, these elements, components, regions, layers and/or sections are not to be limited by theses terms as they are used only to distinguish one element, component, region, layer or section from another element, component, region, layer or section. Thus, a first element, component, region, layer or section could be termed a second element, component, region, layer or section without departing from the scope and teachings of the present embodiment.

Spatially relative terms, such as "beneath," below," "upper," "lower," "above" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms, "comprises" and/or "comprising," when used in this specification, specify the presence of stated features, integers, steps operations, elements, and/or components, but do not preclude the presence or addition of one or more other features, integers, steps, operations, elements, components, and/or groups thereof.

GLOSSARY OF REFERENCE NUMERALS USED HEREIN 10 headlamp
12 first reflector
14 second reflector
16 housing
18 wall
20 double pivot rocker
21 stationary pivot bearing
22 fixed pivot bearing
24 fixed pivot bearing
26 floating pivot bearing
28 floating pivot bearing
30 base member
32 adjusting mechanism
34 threaded member
36 distal end of 34
38 first direction
40 proximal end of 34
42 second direction
44 spherical pivot
46 receptor in double pivot rocker 20
48 first bearing surface
50 face of base member 30.
52 first surface of 18
54 second surface of 18
56 right-angled drive

What is claimed is:

1. A vehicle headlamp comprising: first and second lamp components mounted in a housing having a wall, said first and second lamp components being simultaneously adjustable from a double pivot rocker, said double pivot rocker being mounted to said wall by a stationary pivot bearing; said first and second lamp components each having a fixed pivot bearing fixed to said wall and a floating pivot bearing fixed to said double pivot rocker;
  wherein said stationary pivot bearing is situated between said floating pivot bearings such that when said double pivot rocker pivots, said floating pivot bearings move in generally opposite directions with respect to said stationary pivot bearing, thereby simultaneously adjusting a position of said first and second lamp components.

2. The vehicle headlamp of claim 1 wherein said first and second lamp components are positioned in a vertical array.

3. The vehicle headlamp of claim 1 wherein said double pivot rocker is substantially U-shaped and said stationary pivot bearing is located in a base member.

4. The vehicle headlamp of claim 1 wherein said double pivot rocker is displaced upon actuation of an adjusting mechanism.

5. The vehicle headlamp of claim 4 wherein said adjusting mechanism comprises a threaded member having a distal end projecting in a first direction and a proximal end projecting in an opposite direction, said proximal end being coupled to said double pivot rocker.

6. The vehicle headlamp of claim 5 wherein said proximal end comprises a spherical pivot that is positioned in a receptor in said double pivot rocker and operative to move said double pivot rocker from an initial position to an adjusted position.

7. The vehicle headlamp of claim 1 wherein said lamp components comprise reflectors.

8. The vehicle headlamp of claim 1 wherein displacement of said double pivot rocker by an amount ($\alpha$) in a first direction causes displacement of each of said lamp components by said amount ($\alpha$) in a second direction opposite said first direction.

9. The vehicle headlamp of claim 1 wherein a distance (A) from each said fixed pivot bearing to a location of coupling each said floating pivot bearing to said double pivot rocker is equal for said first and second lamp components.

10. The vehicle headlamp of claim 1 wherein in response to pivotable displacement of said double pivot rocker by an amount ($\alpha$) about said stationary pivot bearing, each of said first and second lamp components displaces said amount ($\alpha$) about its respective fixed pivot bearing.

* * * * *